July 5, 1927.
W. M. SHEEHAN
ELECTRIC LOCOMOTIVE TRUCK
Filed June 9 1926
1,634,308
2 Sheets-Sheet 2
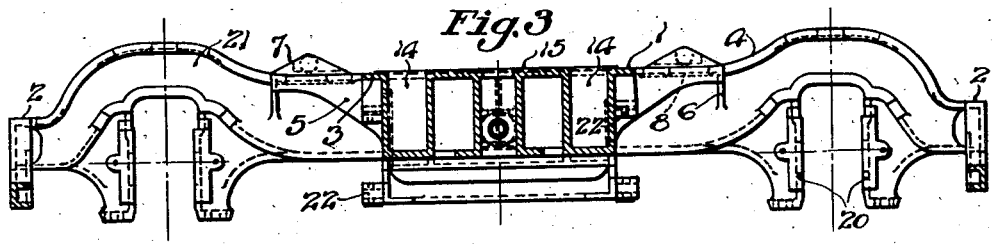
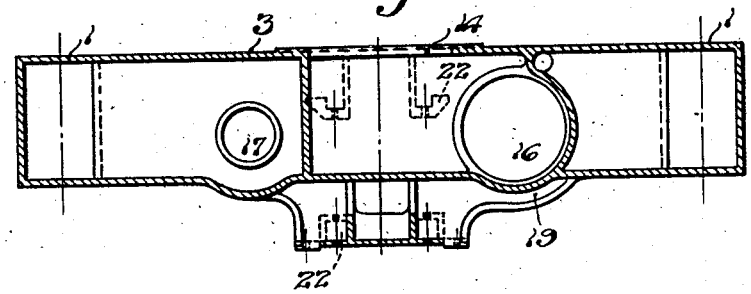
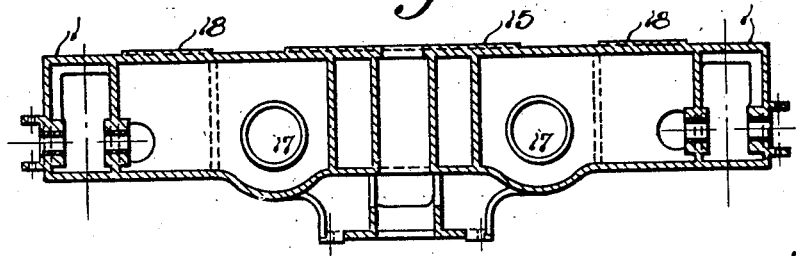
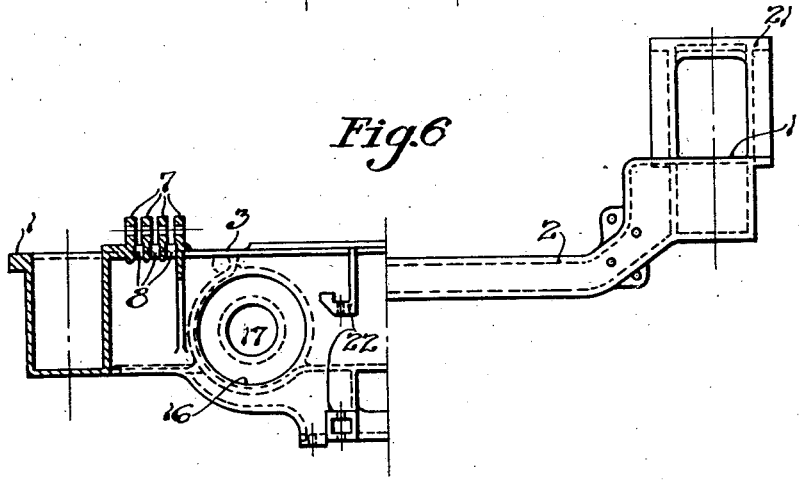
Inventor
William M Sheehan Patented July 5, 1927.

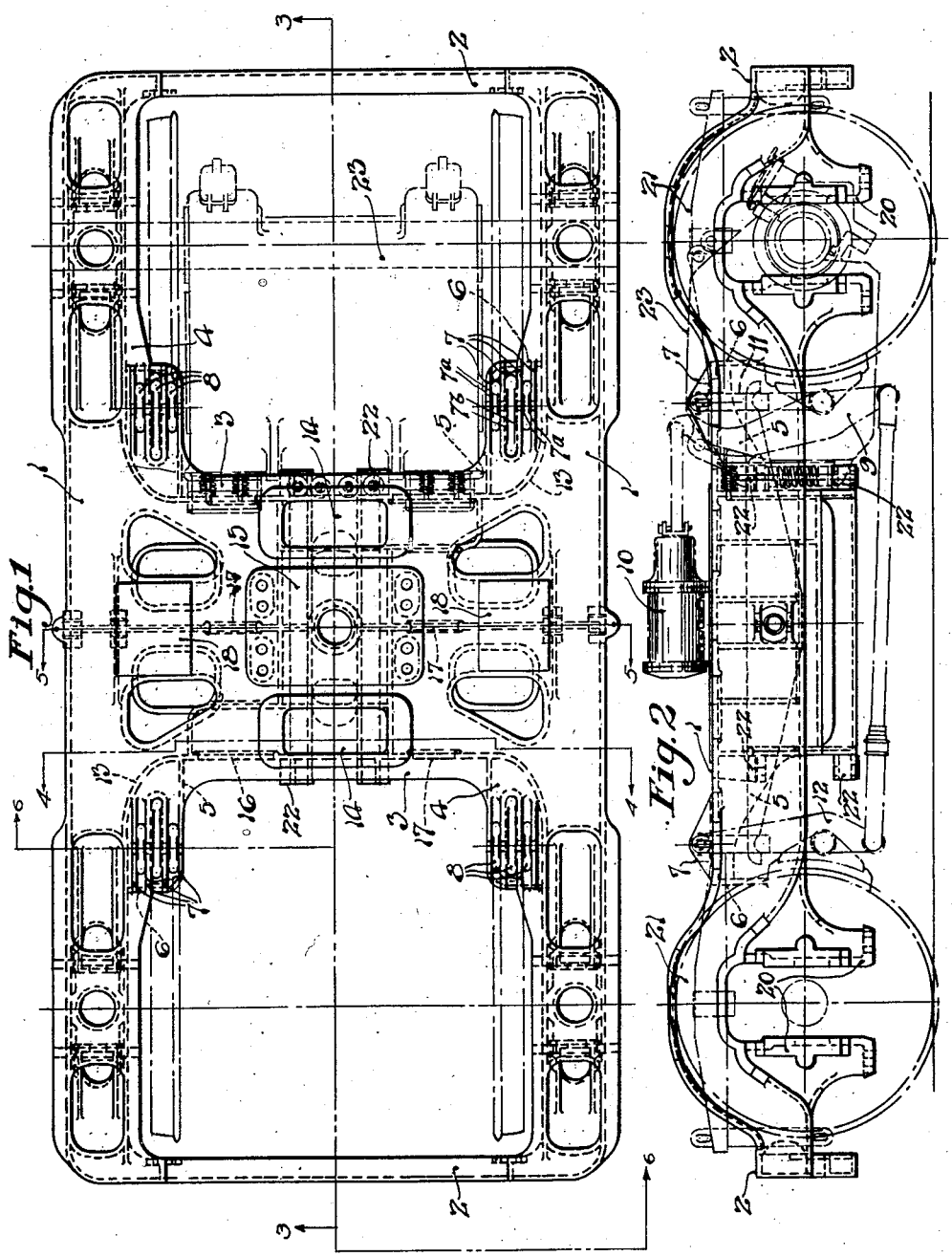

1,634,308

UNITED STATES PATENT OFFICE.

WILLIAM M. SHEEHAN, OF ST. LOUIS, MISSOURI, ASSIGNOR TO COMMONWEALTH STEEL COMPANY, OF GRANITE CITY, ILLINOIS, A CORPORATION OF NEW JERSEY.

ELECTRIC-LOCOMOTIVE TRUCK.

Application filed June 9, 1926. Serial No. 114,743.

My invention relates to railway rolling stock and particularly to electric locomotives, and consists in an improved truck structure adapted to be used on such locomotives.

One of the objects of my invention is to provide a plurality of air conduits in the truck frame adapted to receive a current of air from the locomotive superstructure and to deliver the same to a plurality of motors mounted on the truck.

Another object of my invention is to provide in such a truck a single main transom member located near the center of the truck and connecting the wheel pieces and to brace the transom and wheel pieces from each other by means of corner gussets preferably formed integrally with the transom and wheel pieces and adapted to transmit load stresses from the transom into the wheel pieces and to carry the brake loads into the transom and wheel pieces.

Another object of my invention is to accommodate brake rigging elements by providing points of suspension for the brake hangers and dead lever located above the level of the body of the truck frame.

These and other various detail objects of my invention are secured by the structure described below and illustrated in the accompanying drawings, in which—

Figure 1 is a top view of a four wheel truck frame embodying my invention.

Figure 2 is a side elevation of the same.

Figure 3 is a longitudinal vertical section taken on the center line 3—3 of Figure 1.

Figures 4 and 5 are vertical transverse sections taken on lines 4—4 and 5—5, respectively, of Figure 1.

Figure 6 is in part a vertical transverse section taken on line 6—6 of Figure 1 and in part is an end elevation of the truck.

The truck frame includes wheel pieces 1, end rails 2, and a transom 3 which connects the wheel pieces.

Corner gussets 4 are provided between the transom and wheel pieces and each corner gusset has a longitudinal rib 5, extending downwardly toward the lower portion of the transom, and has a transverse rib 6 extending downwardly toward the inner wall of the adjacent wheel piece 1. On the upper faces of the gussets 4 I provide upstanding lugs 7 and between these lugs the gusset is provided with openings 8 through which brake rigging elements may extend. For instance, I show the brake lever 9 extending through the central opening 8 and connected to the piston of a brake cylinder 10 mounted on a pad 18 on the upper portion of the frame, and I also show brake hangers 11 extending through the side openings 8 and pivotally connected to the lugs. A brake dead lever 12 is similarly pivoted to lug 7. Circular pads 7ª on the side openings 8 have small surfaces machined to form suitable bearings for the brake hangers and the central opening 8 is provided with elongated pads 7ᵇ to form a suitable bearing for the moving lever 9.

The transom is shown as comprising a series of vertical walls spaced from each other and connected by top and bottom walls so as to form a box-like member or a series of box-like members extending between the wheel pieces. The outer walls of the transom curve into the inner walls of the wheel pieces as indicated at 13. The upper wall of the transom has suitable inlet openings 14 provided in front and in rear of the center plate supporting portion 15 and the vertical walls below the top wall provide an air passage from each of the openings 14 to a suitable opening 16 in the outer wall of the transom, opening 16 being located to one side of the longitudinal center line of the truck and the openings on opposite sides of the transom being located on opposite sides of the longitudinal center line of the truck.

It is desirable that the interior of the air conduit be machined in part so as to provide a smooth surface for the application of telescopic tubes (not detailed) which connect the transom air conduit with the interior of the motor housing, and small openings 17, opposite large openings 16, are provided for the insertion of a boring bar extending transversely of the transom. It is intended that each of the openings 17 will be closed by a plate welded to the metal surrounding the opening after the machining of the air duct has been completed.

In view of the amount of metal removed from the walls having openings 16, I prefer to reinforce these walls by flanged ribs 19 located substantially below each of the openings 16.

The wheel pieces are shown as having integral pedestal portions 20, the upper portions of which are formed by arches 21 on the wheel pieces, and the depressed portion of each wheel piece between the pedestals enables me to use the truck with a superstructure frame and side bearings projecting downwardly below the tops of the wheels at the bolster.

Suitable brackets 22 are provided on the side walls of the transom for the purpose of mounting the motors, one of which is indicated at 23.

Some of the features of my present truck are shown in my copending application Serial Number 114,742 in which I describe and claim a transom forming an air conduit with a centrally located inlet opening and with a plurality of outlet openings leading therefrom, the conduit being supplied with air from the superstructure through a single inlet opening. My present invention contemplates the use of a plurality of air passageways leading to the inlet openings 14 with the currents of air maintained wholly separate from each other in the truck conduits.

I claim:

1. In a locomotive truck transom, spaced air ducts formed by the transom walls and closed to each other.

2. In a locomotive truck transom, transverse air ducts formed by the transom walls and spaced longitudinally of the truck, and a center plate supporting portion between said ducts.

3. A locomotive truck frame transom member having integral air ducts each comprising in part a closed box with inlet and outlet openings for air currents, said openings being located, respectively, in the top of the transom in the longitudinal center line of the truck and in one of the vertical walls of the transom at one side of said center line.

4. In a locomotive truck transom, a center plate supporting portion, an air duct on each side of said transom, there being downwardly extending inlet openings in the top of said transom, and outlet openings below the top of said transoms discharging longitudinally of the truck in opposite directions.

5. In a locomotive truck transom, a center plate supporting portion, an air duct on each side of said transom, there being downwardly extending inlet openings in the top of said transom, and outlet openings below the top of said transoms discharging longitudinally of the truck in opposite directions, and on opposite sides of the longitudinal center line of the truck.

6. A one piece casting including a locomotive truck transom with integral air ducts formed therein and leading from spaced points on top of the transom to oppositely facing discharge openings in the side walls of the transom.

7. A one piece casting including a locomotive truck transom with integral air ducts formed therein and leading from spaced points on top of the transom to oppositely facing discharge openings in the side walls of the transom, there being a center plate supporting member formed integrally on said transom between said first mentioned openings.

8. In an electric locomotive truck, wheel pieces, a transom connecting said wheel pieces and including a plurality of vertical walls for transmitting load stresses to said wheel pieces and forming portions of passages for conducting air to the locomotive motors.

9. A one-piece cast truck frame comprising wheel pieces and transom elements including parallel air duct walls extending across the frame, and a center plate support.

10. A casting comprising a truck wheel piece, a transom, and corner gussets between said wheel piece and transom and integral therewith and provided with upstanding lugs for mounting brake rigging elements.

11. In a truck, a frame including a transom, a wheel piece, a corner gusset between said transom and wheel piece, lugs extending upwardly from said gusset, there being openings in said gusset between said lugs, a brake cylinder mounted on said truck frame, and a brake lever extending through one of said openings and operatively connected to said cylinder.

12. In a truck, a truck frame including a transom, a wheel piece, a corner gusset between said transom and wheel piece, a plurality of parallel lugs extending upwardly from said gusset, there being openings between said lugs, a brake cylinder mounted on the top of said frame, a brake lever extending through one of said openings and operatively connected to said cylinder, and one or more brake hangers extending through other of said openings and pivoted on said lugs.

13. In a cast frame for locomotive trucks, a wheel piece, a transom, a horizontal corner gusset connecting said wheel piece and transom, upstanding brake rigging mounting lugs on said gusset, and depending lugs on said gusset integrally connecting the same to said wheel piece and transom at points spaced from said transom and wheel piece, respectively.

14. In a locomotive truck cast frame, a wheel piece, a transom, a horizontal corner gusset connecting the upper portion of said wheel piece and transom, upstanding brake rigging mounting lugs on said gusset, and a depending lug on said gusset integrally connecting the same to said transom at a point spaced from said wheel piece.

15. In a locomotive truck cast frame, a wheel piece, a transom, a horizontal corner gusset connecting the upper portion of said wheel piece and transom, upstanding brake rigging mounting lugs on said gusset, and a depending lug on said gusset integrally connecting the same to said wheel piece at a point spaced from said transom.

In testimony whereof I hereunto affix my signature this 3rd day of June, 1926.

WILLIAM M. SHEEHAN.